US012762764B2

(12) United States Patent
Xu et al.

(10) Patent No.: US 12,762,764 B2
(45) Date of Patent: Oct. 13, 2026

(54) INFRARED IMAGE PROCESSING METHOD, APPARATUS AND DEVICE, AND STORAGE MEDIUM

(71) Applicant: RAYTRON TECHNOLOGY CO., LTD., Yantai (CN)

(72) Inventors: Zhaofei Xu, Yantai (CN); Gangqiang Li, Yantai (CN); Daolu Mou, Yantai (CN); Shaolong Wang, Yantai (CN); Shuigen Wang, Yantai (CN)

(73) Assignee: RAYTRON TECHNOLOGY CO., LTD., Yantai (CN)

( * ) Notice: Subject to any disclaimer, the term of this patent is extended or adjusted under 35 U.S.C. 154(b) by 0 days.

(21) Appl. No.: 19/066,190

(22) Filed: Feb. 28, 2025

(65) Prior Publication Data

US 2025/0200835 A1 Jun. 19, 2025

Related U.S. Application Data

(63) Continuation of application No. PCT/CN2023/072732, filed on Jan. 17, 2023.

(30) Foreign Application Priority Data

Sep. 7, 2022 (CN) ........................ 202211086689.5

(51) Int. Cl.
*G06T 11/10* (2026.01)
*G06T 7/12* (2017.01)
(Continued)

(52) U.S. Cl.
CPC ................ *G06T 11/10* (2026.01); *G06T 7/12* (2017.01); *G06T 7/248* (2017.01); *G06T 7/70* (2017.01);
(Continued)

(58) Field of Classification Search
CPC . G06T 11/10; G06T 7/12; G06T 7/248; G06T 7/70; G06T 2207/10048;
(Continued)

(56) References Cited

U.S. PATENT DOCUMENTS 6,757,428 B1 * 6/2004 Lin ...................... G06F 18/256 382/209
7,079,682 B2 7/2006 Niesen
(Continued)

FOREIGN PATENT DOCUMENTS

CN 101277429 A 10/2008
CN 103854285 A 6/2014
(Continued)

OTHER PUBLICATIONS

Gu Xiaojing et al: "Thermal image colorization using Markov decision processes", Memetic Computing, Springer Berlin Heidelberg, Berlin/ Heidelberg, vol. 9, No. 1, May 23, 2016 (May 23, 2016), pp. 15-22, XP036155400, ISSN: 1865-9284, DOI: 10.1007/812293-016-0193-2 [retrieved on May 23, 2016].
(Continued)

*Primary Examiner* — Thai Q Tran
*Assistant Examiner* — Nienru Yang
(74) *Attorney, Agent, or Firm* — Andrew C. Cheng

(57) ABSTRACT

An infrared image processing method, apparatus and device, and a storage medium are provided. The infrared image processing method includes: acquiring an infrared image; performing target detection on the infrared image to determine target objects within the infrared image and obtaining a target detection result that include a category of each of the target objects; determining a target object of interest from the target objects; determining a contour area of the target object of interest; performing true-color processing on the contour area to highlight the target object of interest. By
(Continued)

highlighting the target object of interest in the infrared image through true-color processing, the target object of interest can be displayed more prominently with different colors and textures according to its category, so that the target object of interest can be presented more clearly in the infrared image clearer and easier for the human eye to observe and recognize.

19 Claims, 16 Drawing Sheets

(51) Int. Cl.

| | |
|---|---|
| ***G06T 7/246*** | (2017.01) |
| ***G06T 7/70*** | (2017.01) |
| ***G06V 10/25*** | (2022.01) |
| ***G06V 10/28*** | (2022.01) |
| ***G06V 10/34*** | (2022.01) |
| ***G06V 10/764*** | (2022.01) |
| ***G06V 10/82*** | (2022.01) |
| ***H04N 23/23*** | (2023.01) |

(52) U.S. Cl.

CPC .............. *G06V 10/25* (2022.01); *G06V 10/28* (2022.01); *G06V 10/34* (2022.01); *G06V 10/764* (2022.01); *G06V 10/82* (2022.01); *H04N 23/23* (2023.01); *G06T 2207/10048* (2013.01); *G06T 2207/20081* (2013.01); *G06T 2207/20084* (2013.01); *G06T 2207/20104* (2013.01); *G06T 2207/20221* (2013.01); *G06T 2207/30241* (2013.01); *G06V 2201/07* (2022.01)

(58) Field of Classification Search

CPC . G06T 2207/20081; G06T 2207/20084; G06T 2207/20104; G06T 2207/20221; G06T 2207/30241; G06V 10/25; G06V 10/82; G06V 10/28; G06V 10/764; G06V 10/34; G06V 2201/07; H04N 23/23

USPC .......................................................... 348/164

See application file for complete search history.

(56) References Cited

U.S. PATENT DOCUMENTS

| | | | | |
|---|---|---|---|---|
| 11,348,269 | B1 * | 5/2022 | Ebrahimi Afrouzi ... | G01S 17/48 |
| 2018/0054573 | A1 | 2/2018 | Handley | |
| 2022/0084210 | A1 * | 3/2022 | Manivannan ........ | G06V 40/193 |
| 2022/0160228 | A1 * | 5/2022 | Leahy .................. | A61B 3/0008 |

FOREIGN PATENT DOCUMENTS

| | | | |
|---|---|---|---|
| CN | 104134073 | A | 11/2014 |
| CN | 108460794 | A | 8/2018 |
| CN | 109804622 | A | 5/2019 |
| CN | 110084830 | A | 8/2019 |
| CN | 111753692 | A | 10/2020 |
| CN | 113378818 | A | 9/2021 |
| CN | 114581351 | A | 6/2022 |
| CN | 115170792 | A | 10/2022 |

OTHER PUBLICATIONS

Carlos R. Del-Blanco et al: "Target Detection Through Robust Motion Segmentation and Tracking Restrictions in Aerial Flir Images", Image Processing, 2007. ICIP 2007. IEEE International Conference on, Jan. 1, 2007 (Jan. 1, 2007), pp. V-445, XP055536215, Pi DOI: 10.1109/ICIP.2007.4379861 ISBN: 978-1-4244-1436-9.

Ge, Man et al., "Infrared Image Colorization Based on Monocular Depth Estimation", Microcomputer Information, vol. 28, No. 10, p. 413-414, published on Oct. 31, 2012.

International Search Report of PCT Patent Application No. PCT/CN2023/072732 issued on May 16, 2023.

* cited by examiner

INFRARED IMAGE PROCESSING METHOD, APPARATUS AND DEVICE, AND STORAGE MEDIUM

FIELD

This application relates to the field of image processing technologies, and in particular, to an infrared image processing method, apparatus, and device, and a computer-readable storage medium.

BACKGROUND

The principle of infrared thermal imaging is to sense, by means of an infrared lens and an infrared detector, infrared rays emitted by an object itself, and infrared images visible to human eyes are formed by photo-electrical conversion. Objects above absolute zero (−273.15° C.) emit infrared radiation outwards, so that the application range of infrared thermal imaging is extremely wide. Due to the characteristics that the infrared thermal imaging can sense the temperature, visible light imaging is not needed, and the interferences by smoke, sand and dust can be avoided, the application of infrared thermal imaging has become very mature in the fields of medical treatment, industry, military and the like.

However, due to the fact that the human eyes cannot observe the infrared rays, the current infrared thermal imaging is basically to reflect the infrared thermal radiation. The converted infrared image is very different from the visible light image normally observed by human eyes, so that people need a period of training to adapt to the use of the infrared thermal imaging. In addition, the infrared thermal image can only reflect the overall thermal radiation of the object, but cannot present details of the object, which is therefore not suitable for scenarios where specific categories and details need to be distinguished.

SUMMARY

The present application is directed to an infrared image processing method, apparatus and device capable of effectively highlighting an observation target, and a computer-readable storage medium.

In one aspect, embodiments of the present application provide an infrared image processing method, comprising:

- acquiring an infrared image;
- performing target detection on the infrared image to determine one or more target objects within the infrared image and obtaining a target detection result that include a category of each of the one or more target objects;
- determining a target object of interest from the one or more target objects based on the target detection results;
- determining a contour area of the target object of interest;
- performing true-color processing on the contour area based on the category of the target object of interest to highlight the target object of interest in the infrared image.

Optionally, determining the target object of interest from the one or more target objects includes:

- determining the target object of interest based on a selection operation on the target object.

Optionally, performing true-color processing on the contour area based on the category of the target object of interest to highlight the target object of interest in the infrared image includes:

- determining a corresponding true-color template based on the category of the target object of interest, and coloring the contour area of the target object of interest in the infrared image according to the corresponding true-color template for display.

Optionally, determining the contour area of the target object of interest includes:

- segmenting the target object of interest based on its position information to obtain a contour segmentation image of the target object of interest;
- determining a corresponding true-color template based on the category of the target object of interest, and coloring the contour area of the target object of interest in the infrared image according to the corresponding true-color template for display includes:
- determining a corresponding true-color template based on the category of the target object of interest, coloring the contour segmentation image according to the corresponding true-color template;
- fusing the colored contour segmentation image with the original infrared image, and/or enlarging the colored contour segmentation image by a preset ratio and fusing it with the original infrared image at a specified display position.

Optionally, after determining a target object of interest from the one or more target objects, the method further comprises, the method further includes:

- performing target tracking on the target object of interest to obtain trajectory prediction information; and
- displaying motion trajectory prompt information of the target object of interest in the infrared image based on the trajectory prediction information.

Optionally, displaying the motion trajectory prompt information of the target object of interest in the infrared image based on the trajectory prediction information includes:

- displaying motion direction prompt information on one side of the target object of interest in the infrared image based on the trajectory prediction information.

Optionally, displaying the motion trajectory prompt information of the target object of interest in the infrared image based on the trajectory prediction information includes:

- determining a motion path of the target object of interest based on the trajectory prediction information and displaying the motion path in the infrared image.

Optionally, displaying the motion trajectory prompt information of the target object of interest in the infrared image based on the trajectory prediction information includes:

- determining a next predicted position of the target object of interest in the infrared image based on the trajectory prediction information, and displaying a corresponding virtual image of the target object of interest at the next predicted position in the infrared image.

Optionally, performing target tracking on the target object of interest to obtain trajectory prediction information includes:

- performing feature extraction on a target region of the target object of interest to obtain a first feature extraction result;
- setting target boxes with different step sizes and scales, searching from the target region as a starting position, respectively performing feature extraction on regions where the target boxes are located to obtain respective second feature extraction results;
- based on feature similarity between the second feature extraction result of each target box and the first feature extraction result, determining the region where the target box whose feature similarity meets a requirement is located as a target tracking region of the target object of interest; and obtaining the trajectory prediction information based on the target tracking region.

Optionally, after, based on feature similarity between the second feature extraction result of each target box and the first feature extraction result, determining the region where the target box whose feature similarity meets a requirement is located as a target tracking region of the target object of interest, the method further comprises:

determining a reference step size and a reference direction for a next trajectory prediction of the target object of interest based on relative position information between the target tracking region and the target region.

Optionally, setting target boxes with different step sizes and scales, searching from the target region as a starting position, respectively performing feature extraction on regions where the target boxes are located to obtain respective second feature extraction results, includes:

setting different scales by different ratios based on the size of the target object of interest, setting different step sizes according to the category of the target object of interest following a linear motion pattern, and respectively setting the target boxes in all directions around the target region where the target object of interest is located with the different step sizes and scales; and searching within a specified image region from the target region as the starting position, and performing feature extraction on the regions where the target boxes are located to obtain the respective second feature extraction results.

Optionally, performing target detection on the infrared image to determine one or more target objects includes:

performing binarization processing on the infrared image to obtain a corresponding mask image;

performing image morphological filtering on the mask image to obtain a target object mask image corresponding to the infrared image;

fusing the target object mask image with the original infrared image to obtain a target screening image, and performing target detection on the target screening image to determine category and position information of the one or more target objects contained in the infrared image.

Optionally, performing target detection on the target screening image to determine category and position information of the one or more target objects contained in the infrared image includes:

performing target detection on the target screening image using a trained detection model to determine the category and location information of the one or more target objects contained in the infrared image;

wherein the detection model is obtained by training a neural network model with a training sample set, the training sample set including training sample images containing different target objects and their respective categories and position labels.

Optionally, performing binarization processing on the infrared image to obtain the corresponding mask image includes:

setting pixels in the infrared image that are above a temperature threshold to a first grayscale value, and setting pixels that are below the temperature threshold to a second grayscale value, to obtain the corresponding mask image;

performing image processing on the mask image by first performing erosion followed by dilation to obtain the target object mask image corresponding to the infrared image.

In a second aspect, embodiments of the present application provide an infrared image processing apparatus, comprising: an acquisition module configured to acquire an infrared image; a detection module configured to perform target detection on the infrared image to determine one or more target objects within the infrared image to obtain a target detection result that includes categories of the respective target objects; a determination module configured to determine a target object of interest from the one or more target objects based on the target detection result; a segmentation module configured to determine a contour area of the target object of interest; a display module configured to perform true-color processing on the contour area based on the category of the target object of interest to highlight the target object of interest in the infrared image.

In a third aspect, embodiments of the present application provide an infrared thermal imaging device, comprising a processor, a memory coupled to the processor, and a computer program stored on the memory and executable by the processor, wherein the computer program, when executed by the processor, implements the infrared image processing method according to any one of the above embodiments.

The infrared thermal imaging device further includes an infrared photographing module and a display module connected to the processor; the infrared photographing module is configured to capture an infrared image and send it to the processor; the display module is configured to display the infrared image output by the processor, with the target object of interest being highlighted in the infrared image.

In a fourth aspect, embodiments of the present application provide a computer-readable storage medium, the computer-readable storage medium stores a computer program thereon, and the computer program, when executed by a processor, implements the infrared image processing method according to any one of the above embodiments.

In the above embodiments, by acquiring an infrared image, performing target detection on the infrared image to determine one or more target objects within the infrared image, determining a target object of interest from the one or more target objects based on the target detection results, determining a contour area of the target object of interest, performing true-color processing on the contour area based on the category of the target object of interest to highlight the target object of interest in the infrared image. By highlighting the target object of interest in the infrared image through true-color processing, the method enables the target object of interest to be displayed more prominently with different colors and textures according to its category, so that the target object of interest can be presented more clearly in the infrared image clearer and easier for the human eye to observe and recognize.

In the above embodiments, the infrared image processing apparatus, the infrared thermal imaging device, and the computer-readable storage medium share the same concept as the corresponding infrared image processing method embodiments. Therefore, they achieve the same technical effects as the corresponding infrared image processing method embodiments, which are not repeated here.

DESCRIPTION OF THE EMBODIMENTS

The technical solution of the present invention is further described in detail below with reference to the accompanying drawings and specific embodiments of the specification.

In order to make the objectives, technical solutions, and advantages of this application clearer, the following further describes this application in detail with reference to the accompanying drawings, and the described embodiments are not to be considered as limitations to this application, and all other embodiments obtained by a person of ordinary skill in the art without creative efforts shall fall within the protection scope of this application.

In the following description, the expressions relating to "some embodiments" describe a subset of all possible embodiments, and it should be noted that "some embodiments" may be the same subset or different subsets of all possible embodiments, and may be combined with each other where there is no conflict.

In the following description, the terms "first, second, and third" are merely intended to distinguish between similar objects, and do not represent a specific order for the objects. It may be understood that "first, second, and third" may be interchanged in a specific order or sequence if allowed, so that the embodiments of this application described herein can be implemented in an order other than those shown or described herein.

Figure 1:
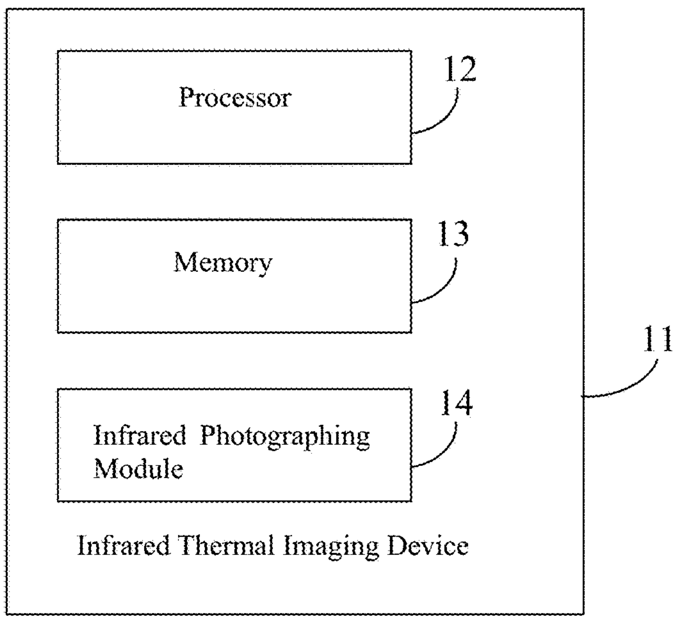
FIG. 1 is a schematic diagram of an application scenario of an infrared image processing method according to an embodiment.

FIG. 1 is a schematic diagram of an optional application scenario of an infrared image processing method according to an embodiment of this application, in which an infrared thermal imaging device 11 includes a processor 12, and a memory 13 and an infrared photographing module 14 coupled to the processor 12. The infrared photographing module 14 of the infrared thermal imaging device 11 captures infrared images in real time and sends the infrared images to the processor 12. The memory 13 is stored therein with a computer program for implementing the infrared image processing method provided in the embodiments of the present application. The processor 12, by executing the computer program, recognizes one or more target objects in the infrared image by performing target detection on the infrared image, determines a target object of interest from the one or more recognized target objects, determines a contour area of the target object of interest, and performs a true-color processing based on a category of the target object of interest to highlight the target object of interest in the infrared image. The infrared thermal imaging device 11 may be one of various smart terminals integrated with the infrared photographing module 14 having the infrared image photographing function and equipped with storage and processing functions, such as a handheld observer, various types of aiming devices, vehicle-mounted/airborne electro-optical payload devices, etc.

Figure 2:
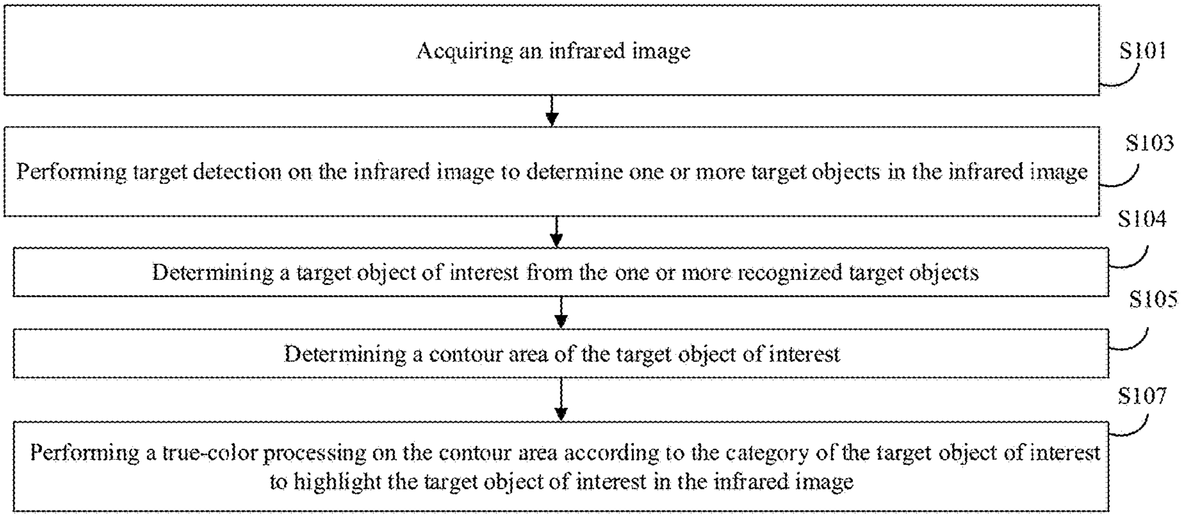
FIG. 2 is a schematic diagram of an application scenario of an infrared image processing method according to another embodiment.

Referring to FIG. 2, an infrared image processing method according to an embodiment of this application is shown, which may be applied to the infrared thermal imaging device in the application scenario shown in FIG. 1. The infrared image processing method includes the following steps:

S101, acquiring an infrared image;

The infrared thermal imaging device may include a photographing module. In one embodiment, the photographing module may be an infrared photographing module, which includes an infrared lens and an infrared detector, the infrared detector including various cooled or non-cooled short-wave, medium-wave, or long-wave detectors. Acquiring the infrared image includes acquiring an infrared image of a target scene in real time through the photographing module of the infrared thermal imaging device. In some alternative embodiments, the infrared thermal imaging device does not include a photographing module, and acquiring the infrared image includes: acquiring, by the infrared thermal imaging device, an infrared image transmitted from another smart device having a photographing function, and the another smart device may be an infrared detector, a mobile phone terminal, a cloud, and the like.

S103, performing target detection on the infrared image to determine one or more target objects in the infrared image;

The infrared thermal imaging device performs target detection on the infrared image, and recognizes one ore more target objects in the infrared image through the target detection to obtain a target detection result that contains a category of each recognized target object. The target detection may use a conventional target detection algorithm based on Haar feature extraction to detect a target, a target detection algorithm based on a deep learning model, or the like.

The target object in the infrared image is recognized through the target detection, and the recognized target object is displayed in the infrared image to allow for an interactive operation of the user for selection.

The target object may be an image content in the infrared image that the user wants to focus on, and may be one or more preset categories of objects, such as persons, different animals, vehicles, and the like.

S104, determining a target object of interest from the one or more recognized target objects;

One or more target objects in the infrared image are determined through the target detection, and then the target object of interest is determined from the target detection result, so that the accuracy and efficiency of determining the target object of interest can be improved. Optionally, the target object of interest may be determined from the target detection result in at least one of the following manners: taking the target object of a preset category in the target detection result as the target object of interest; taking the target object located at a preset position in the infrared image in the target detection result as the target object of interest; taking the target object whose size meets a preset requirement in the target detection result as the target object of interest; and taking the target object selected by an interactive operation from the target detection result as the target object of interest.

S105, determining a contour area of the target object of interest;

A contour area of the target object of interest may be determined by a contour detection algorithm which extracts contour line information of the target object of interest, or by an image segmentation algorithm which determines a contour segmentation image of the target object of interest, or based on position information of each target object obtained in the target detection result.

S107, performing a true-color processing on the contour area according to the category of the target object of interest to highlight the target object of interest in the infrared image.

The target object of interest is subjected to true-color processing on the contour area of the target object according to its category, corresponding true-color templates can be preset for different categories, and the contour area of the target object of interest is colored by the corresponding true-color template, so that each target object of interest is highlighted in a different color and texture in the infrared image by category. True-color processing is performed on the contour area of the target object of interest, so that in the imaging region of the target object of interest, each pixel value of the image of target object of interest has three primary color components R, G and B. Each primary color component directly determines the intensity of primary color of the display device to produce a color, which is consistent with the color rendering of the visible light image, thus better conforming to the human eye perception system.

In the above embodiment, the infrared image is acquired, target detection is performed on the infrared image to determine one or more target objects in the infrared image, a target object of interest is determined from the target detection result, and in the infrared image, a contour area of the target object of interest is subjected to true-color processing in accordance with the category of the target object of interest so as to highlight the target object of interest in the infrared image. Through the true-color processing, different target objects of interest can be displayed with different coloring and texture highlighting by category, so that the target objects of interest in the infrared image can be presented more clearly and easier for human eyes to observe and recognize.

Optionally, the step S104 of determining a target object of interest from the one or more target objects includes:

determining the target object of interest according to a selection operation on the target object.

The selection operation on the target object may vary with different interactive operation types supported by the infrared thermal imaging device. Optionally, the infrared thermal imaging device provides an interactive touch interface, in which each target object recognized by means of target detection on the infrared image is displayed, and the user may directly select a target object in the interactive touch interface as the current target object of interest. In some other optional embodiments, the infrared thermal imaging device provides a non-touch display interface and is provided with an operation key, and each target object recognized by the target detection on the infrared image is displayed in the non-touch display interface. The non-touch display interface is provided with a selection box, and the user can operate the operation key to move the selection box to select a certain target object as the current target object of interest. As another optional embodiment, the infrared thermal imaging device may support voice input, each target object recognized by the target detection on the infrared image is displayed in the display interface and is assigned with a number uniquely indicative of its identity information, and the user may voice input the number of the target object that the user wants to select to complete the selection operation for determining the target object of interest.

In response to the selection operation of the user, the infrared thermal imaging device takes the selected target object as the current target object of interest, and subsequent determining of and true-color processing on the contour area are performed only on the selected target object of interest, so as to meet the requirement of the user for selecting the current observation object in real time.

In some embodiments, the step S107 of performing true-color processing on the contour area according to the category of the target object of interest to highlight the target object of interest in the infrared image includes:

determining a corresponding color template according to the category of the target object of interest, and coloring the contour area of the target object of interest in the infrared image according to the corresponding color template and then displaying the colored contour area of the target object of interest.

The category of the target object may be determined as follows: target detection and positioning are performed on the image acquired by the infrared thermal imaging device, and the category of the target object may be determined according to the category of the positioned target. Taking an infrared aiming device applied to an outdoor hunting scenario as an example of the infrared thermal imaging device, and the preset categories of the target objects may include pedestrians, vehicles, birds, rabbits, cattle, sheep, wolves, dogs, pigs, and cats. Optionally, different color templates may be preset for different categories of target objects, a color template is correspondingly determined according to the selected category of the target object of interest, and the target object of interest is colored and displayed in the infrared image according to the color template corresponding to the target object. For example, assuming the color template corresponding to birds is a blue template, if the selected target object of interest in the current infrared image is a bird, the target object of interest is then colored according to the blue template and displayed; assuming the color template according to rabbits is a yellow template, if the selected target object of interest in the current infrared image is a rabbit, the target object of interest is then colored according to the yellow template and displayed. Optionally, each color template may further include texture information, for example, the corresponding color template for birds may be a blue feather texture template, and if the selected target object of interest in the current infrared image is a bird, the target object of interest is colored according to the blue feather texture template and displayed; the corresponding color template for rabbits may be a yellow fluff texture template, and if the selected target object of interest in the current infrared image is a rabbit, the target object of interest is then colored according to the yellow fluff texture template and displayed.

By setting different color templates according to the category of the target object of interest, different targets of interest can be highlighted with different colors and textures. The category of the target object more concerned by the user can be highlighted with a more eye-catching color that better conforms to the perception of the user according to his/her own preference, thus reducing inadaptability and eye fatigue, and reducing errors in the process of tracking the concerned target through the infrared image.

In the above embodiment, the target object of interest is colored and displayed according to different color templates by category, so that the target concerned by the user in the infrared image can be displayed in a manner conforming to the perception mode of human eyes on visible light, thus improving the accuracy of target recognition.

In some embodiments, the step S105 of determining a contour area of the target object of interest includes:

segmenting the target object of interest according to position information of the target object of interest to obtain a contour segmentation image of the target object of interest.

Determining a corresponding color template according to the category of the target object of interest, and coloring the contour area of the target object of interest in the infrared image according to the corresponding color template and then displaying the colored contour area of the target object of interest includes:

determining a corresponding color template according to the category of the target object of interest, and coloring the contour segmentation image according to the corresponding color template; and fusing the colored contour segmentation image with the original infrared image; and/or, enlarging the colored contour segmentation image by a preset ratio, and fusing the enlarged colored contour segmentation image with the original infrared image according to a specified display position.

The position information of the target object of interest may be obtained from the step of performing target detection on the infrared image. For example, the target detection result obtained by performing target detection on the infrared image includes corresponding categories and position information of all target objects contained in the infrared image. The position information may be, but is not limited to, any one of the following: a combination of center point coordinates and size information of the target object of interest, a combination of coordinates of four corner points on an outer contour of the target object of interest, and a combination of coordinates of a lower left corner point of the target object of interest and size information. According to the position information of the target object of interest, content extraction is performed on a region image of the target object of interest in the infrared image to obtain a contour segmentation image of the target object of interest, the contour segmentation image of the target object of interest obtained by segmentation is colored according to a corresponding color template, and the colored contour segmentation image and the original infrared image are fused for display.

Figure 3:
FIG. 3 is a schematic diagram of a contour segmentation image in an optional specific example.
Figure 4:
FIG. 4 is a schematic diagram of a contour segmentation image with a target object of interest therein subjected to a true-color conversion in an example.

The segmentation method for obtaining the contour segmentation image corresponding to the target object according to the position information of the target object of interest may include, but is not limited to, an Otsu method, a grayscale threshold segmentation method, a temperature segmentation method, a deep learning model segmentation method, and the like. FIG. 3 is a schematic diagram of a contour segmentation image in an optional specific example. According to the contour segmentation image and the category of the target object of interest, the object of interest in the contour segmentation image is colored according to the corresponding one of the true-color templates preset for different categories, so that the target is more prominent, which conforms to human eye perception. For example, humans and different types of animals may be respectively colored, to avoid target misjudgment caused by failing to differentiate between specific categories in the infrared image due to similar temperature. FIG. 4 is a schematic diagram of a contour segmentation image obtained by true-color conversion on the target object of interest in the contour segmentation image.

Image fusion is an image processing technology used to process image data collected by multiple source channels about the same target, which extracts useful information from respective channels to the maximum extent and finally synthesizes a high-quality image, so as to improve the utilization rate of the image information, the accuracy and reliability of the computer interpretation, and the spatial resolution and the spectral resolution of the original image, and facilitate target monitoring. The contour segmentation image subjected to the true-color conversion on the target object of interest is fused with the original infrared image, so that the colored target object of interest replaces the original target in the original infrared image to obtain a fused image, with the target object of interest highlighted in the original infrared image in a preset manner.

Optionally, the infrared thermal imaging device may also enlarge the contour segmentation image subjected to the true-color conversion of the target object of interest by a preset ratio, and then fuse the enlarged contour segmentation image with the original infrared image according to a specified display position. The specified display position may mean that the proportionately enlarged and colored target object of interest is uniformly displayed at a certain position in the current image field of view, such as in the lower-left corner; alternatively, the original target is replaced by the proportionately enlarged and colored target object of interest, so as to avoid the difficulty in observing the target due to that the original target may be small in size in the field of view.

Figure 5:
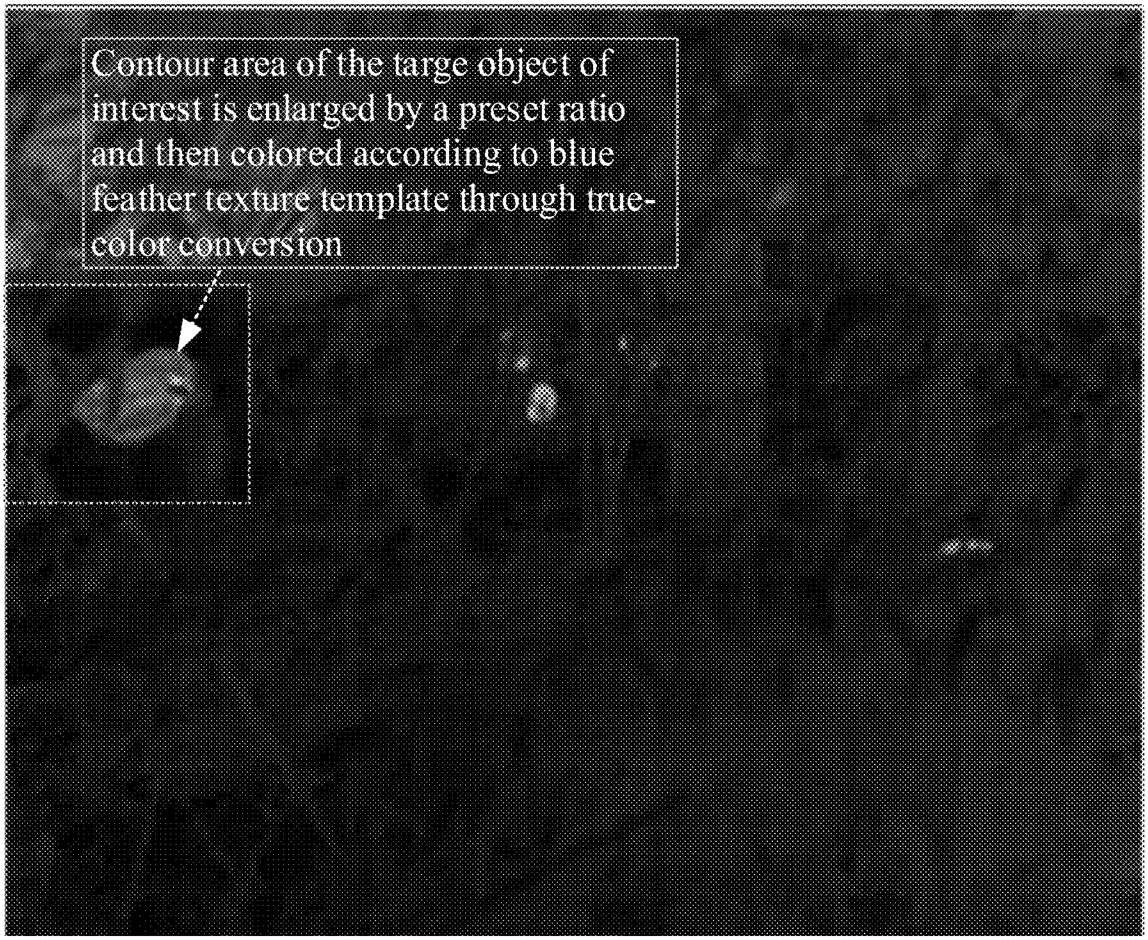
FIG. 5 is a schematic diagram of an infrared image with a target object being highlighted in an example.

The infrared thermal imaging device may fuse the colored contour segmentation image with the original infrared image and, at the same time, enlarge the colored contour segmentation image by a preset ratio and fuse the enlarged colored contour segmentation image with the original infrared image according to the specified display position. As shown in FIG. 5, the user may observe more details and clearer contour of the target object in the fused image.

In the infrared thermal imaging device of the above embodiment, by fusing the colored contour segmentation image of the target object of interest with the original infrared image, or by enlarging the colored contour segmentation image by a preset ratio and fusing the enlarged colored contour segmentation image with the original infrared image, the target object of interest can be highlighted in the infrared image in a manner conforming to the color perception of the human eye on the visible light image, which facilitates observation and recognition of the target by the human eye.

Optionally, after determining the target object of interest from the one or more target objects, S104 further includes:

performing target tracking on the target object of interest to obtain trajectory prediction information; and displaying motion trajectory prompt information of the target object of interest in the infrared image according to the trajectory prediction information.

The trajectory prediction information may include at least one of the following: a next predicted position of the target object of interest, a predicted motion direction of the target object of interest, a predicted motion trajectory of the target object of interest, and the like. Correspondingly, displaying the motion trajectory prompt information of the target object of interest in the infrared image according to the trajectory prediction information may mean marking the next predicted position of the target object of interest in the infrared image, marking the predicted motion direction of the target object of interest in the infrared image, and marking the predicted motion trajectory of the target object of interest in the infrared image.

The target object of interest is determined based on the target detection result, and target tracking is performed only on the target object of interest, thus greatly reducing the calculation amount, increasing the efficiency of target tracking, and improving the accuracy of the target tracking result.

In the foregoing embodiment, the target detection is performed on the infrared image to allow the user to select the current target object of interest from the target detection result, which can reduce the complexity of the subsequent trajectory prediction for the target object of interest and improve the accuracy of trajectory prediction. In addition, target tracking is performed on the target object of interest to obtain trajectory prediction information, and the motion trajectory prompt information of the target object of interest is displayed in the infrared image. By highlighting the target object of interest in the infrared image and at the same time displaying the motion trajectory prompt information of the target object, the target of interest in the infrared image can be presented more clearly, thereby facilitating accurate tracking of the moving target according to the motion trajectory prompt information.

In some embodiments, displaying the motion trajectory prompt information of the target object of interest in the infrared image according to the trajectory prediction information includes:

displaying motion direction prompt information on a side of the target object of interest of the infrared image according to the trajectory prediction information; and/or determining a motion path of the target object of interest according to the trajectory prediction information, and displaying the motion path in the infrared image; and/or determining a next predicted position of the target object of interest in the infrared image according to the trajectory prediction information, and displaying a corresponding virtual image of the target object of interest at the next predicted position in the infrared image.

Figure 6:
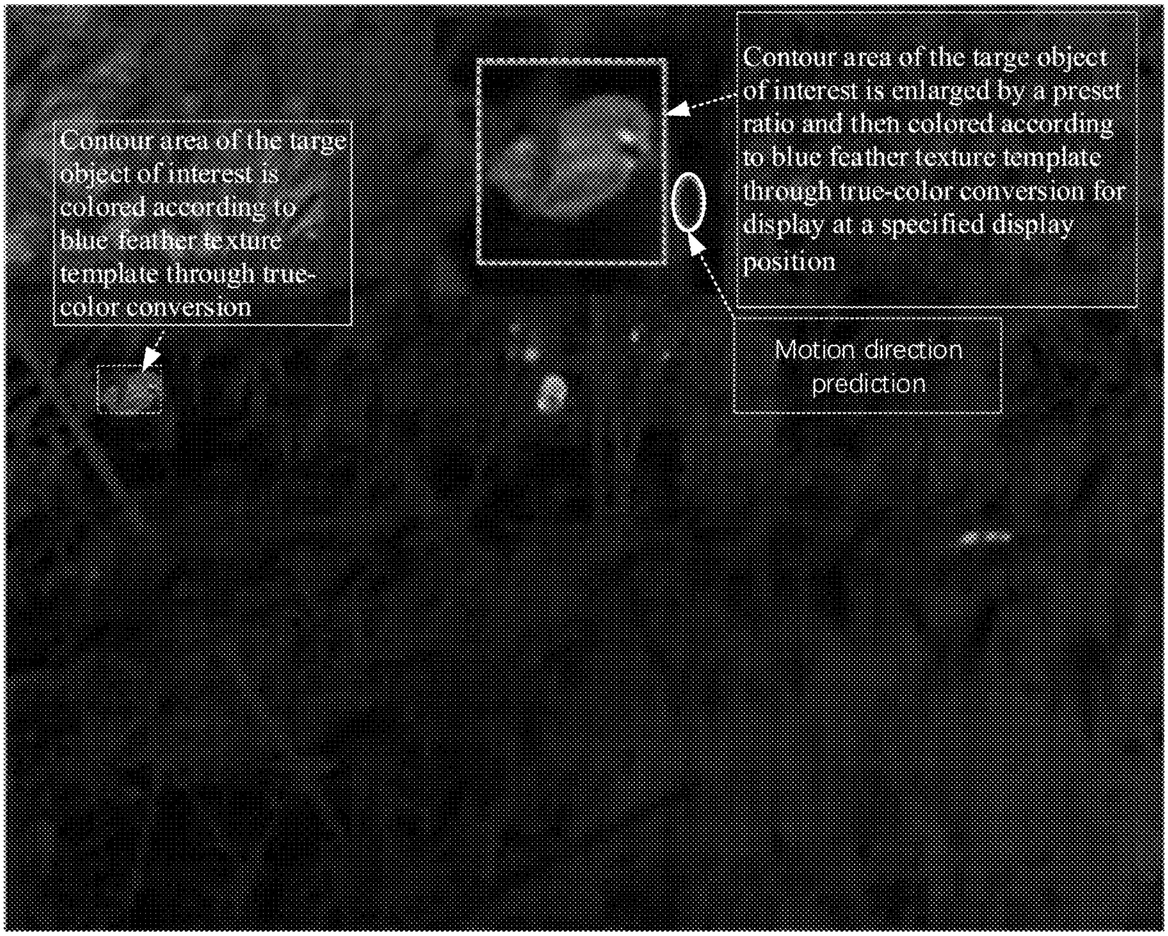
FIG. 6 is a schematic diagram of an infrared image with movement direction prompt information of a target object displayed therein in an example.
Figure 7:
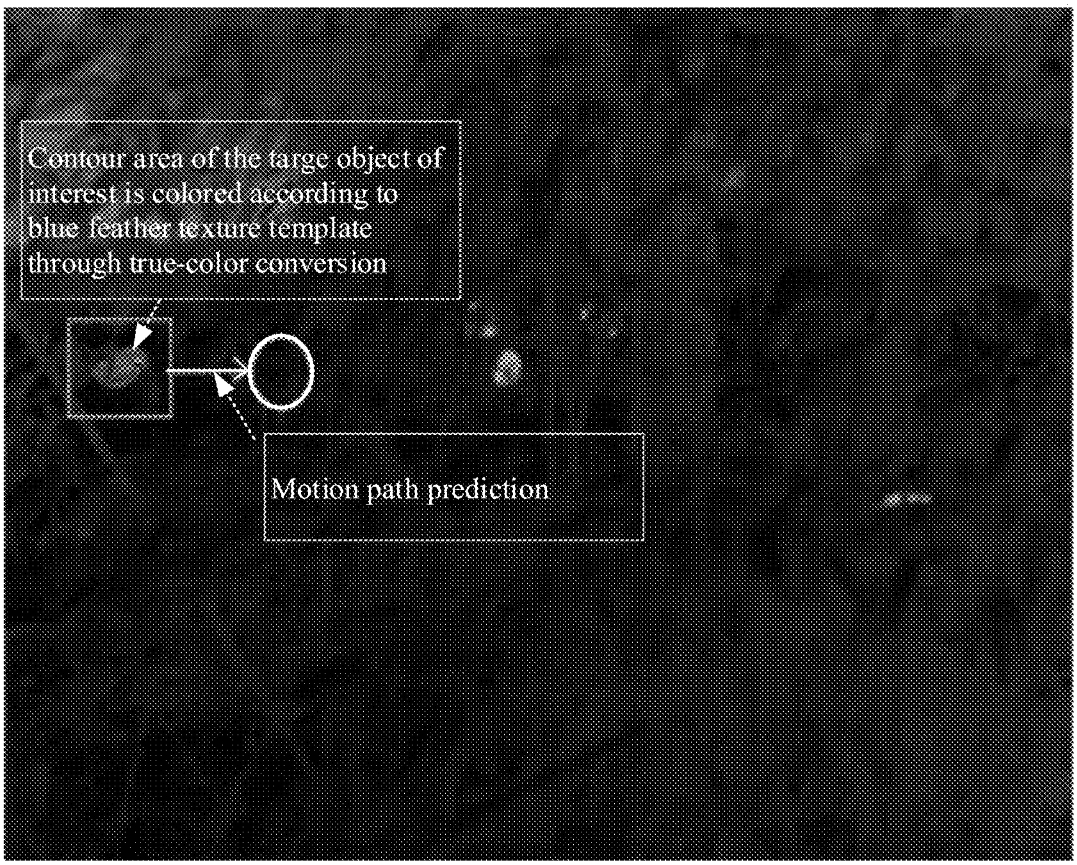
FIG. 7 is a schematic diagram of an infrared image with a motion path of a target object displayed therein in an example.
Figure 8:
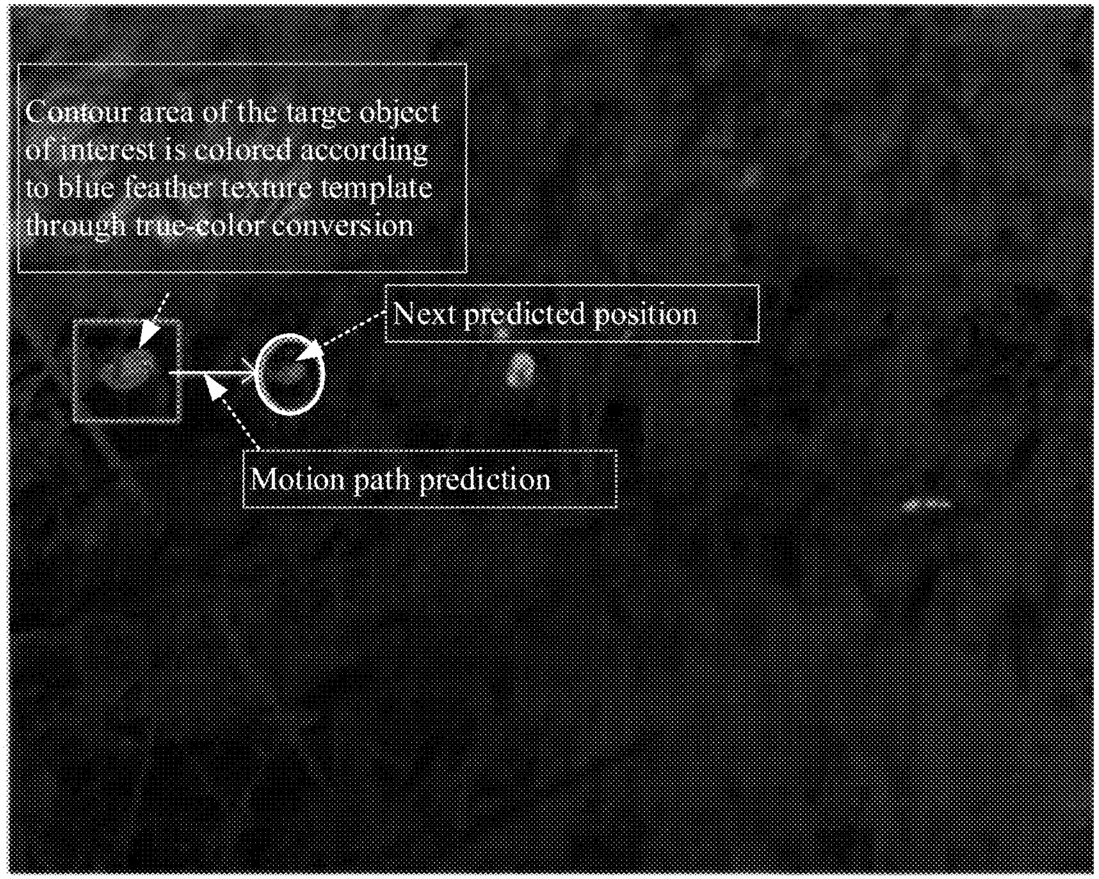
FIG. 8 is a schematic diagram of an infrared image with a next predicted position of a target object displayed therein in an example.

The trajectory prediction information may include one or more types of information indicative of motion trajectory characteristics of the target of interest. For example, the trajectory prediction information includes information indicative of a motion direction of the target object of interest, and according to the trajectory prediction information, a designated mark is displayed on one side of the moving target object of interest of the infrared image, and the position of the designated mark indicates that the motion direction of the target object of interest is to the corresponding side. As shown in FIG. 6, the circular mark displayed on the right side of the target object of interest indicates that the predicted motion direction of the target object of interest is to the right. The trajectory prediction information includes information indicative of a motion path of the target object of interest, and according to the trajectory prediction information, a motion path of the target object of interest is displayed in the infrared image. As shown in FIG. 7, an arrow is displayed on the right side of the target object of interest, and the motion path of the target object of interest is represented by the arrow. The trajectory prediction information includes information indicative of a position of the target object of interest at a next prediction moment, a designated mark is displayed at the position of the target object of interest in the infrared image at the next prediction moment according to the trajectory prediction information, and the next predicted position of the target object of interest is represented by the position of the designated mark. As shown in FIG. 8, a virtual icon is displayed at an end of the arrow on the right side of the target object of interest, and the position of the virtual icon represents the next predicted position of the target object of interest.

Optionally, each type of motion trajectory prompt information can correspond to a display mode. For example, a display mode 1 shows the predicted motion direction prompt information, a display mode 2 shows the predicted motion path, and a display mode 3 shows a virtual icon at the predicted next position. Users can choose, from the multiple display modes, the corresponding motion trajectory prompt information to be displayed in the current infrared image, such as motion direction prompt information, motion path, or virtual icon.

In the above embodiments, by performing single-target tracking on the user-selected target of interest to obtain the trajectory prediction information, and displaying the motion trajectory prompt information of the target of interest in the infrared image based on the trajectory prediction information, users can quickly and accurately capture the moving target of interest through the infrared image, which is particularly suitable for outdoor hunting scenarios.

In some embodiments, performing target tracking on the target object of interest to obtain trajectory prediction information includes:

performing feature extraction on a target region where the target object of interest is located to obtain a first feature extraction result; and respectively setting target boxes with different step sizes and scales, searching from the target region as a starting position using these target boxes, and respectively performing feature extraction on regions where the respective target boxes are located to obtain respective second feature extraction results; and determining, based on feature similarity between the second feature extraction results corresponding to the target boxes and the first feature extraction result, the region corresponding to the target box with its feature similarity meeting a requirement as a target tracking region of the target object of interest; and obtaining the trajectory prediction information according to the target tracking region.

Figure 9:
FIG. 9 is a schematic diagram of a target detection result obtained by performing target detection on an infrared image in an example.

The target objects recognized from the infrared image by means of target detection on the infrared image can be screened by a user according to information of interest, and one of the target objects can be selected as the target object of interest. As shown in FIG. 9, which is a schematic diagram of a target detection result obtained by performing target detection on an infrared image in an optional specific example, the target detection result includes a first target object ID 1, a second target object ID 2, a third target object ID 3, and a fourth target object ID 4. The user can select the target object of interest through human-computer interactive operations, such as selecting the first target object ID 1 as the target object of interest. The infrared thermal imaging device performs feature extraction on the selected target object of interest for tracking and trajectory prediction. By performing target detection on the infrared image captured in the current scene, the available target objects for user selection in the current scene can be preliminarily provided, and then the user can select one target object of interest through human-computer interactive operations for tracking. Subsequently, single-target feature extraction can be performed for the target tracking and trajectory prediction, which can not only simplify the tracking calculation but also help to improve the tracking accuracy.

Feature extraction on a specified region of the infrared image may include, but are not limited to, extraction of Haar features, HOG features, or features extracted based on a convolutional neural network. Here, feature extraction is performed on a specified region of the infrared image, including feature extraction on a target region where the target object of interest is located to obtain a first feature extraction result as well as, when searching through the target box, feature extraction on the region where each target box is located to obtain the second feature extraction result. Taking the selection of the first target object ID 1 and the use of HOG feature extraction as an example, according to the position information (x, y, w, h) of the first target object ID 1, where (x, y) is the center point position of the first target object ID 1, and (w, h) is the width and height of the first target object ID 1, the HOG feature calculation only processes the content of the target region, mainly including four steps: gradient calculation, gradient histogram calculation, block normalization, and HOG feature statistics.

The gradient calculation step includes: calculating a total gradient magnitude of a pixel point as $$g=\sqrt{g_x^2+g_y^2},$$

and calculating a gradient direction as $$\theta=\arctan\frac{g_x}{g_y},$$

with the gradient direction taken as an absolute value, where $g_x$ represents a horizontal gradient of a single pixel point which is the difference in pixel values between left and right neighbouring pixel points, and $g_y$ represents a vertical gradient which is the difference in pixel values between upper and lower neighbouring pixel points.

The gradient histogram calculation step includes: dividing a pixel matrix into a cell, and performing gradient histogram statistics according to the gradient information of the pixel points in each cell.

The block normalization step includes: when the change range of the gradient magnitude exceeds a preset value, normalizing the gradient magnitude, forming a block by multiple cells, and sequentially connecting the feature vectors of all the cells in the normalized block in sequence to obtain the HOG feature of the block.

The HOG feature statistics step includes: collecting HOG features of all overlapping blocks in a detection window, and combining them into a final feature vector as a feature extraction result corresponding to the target region.

The feature extraction based on a convolutional neural network may refer to that a feature extraction model is obtained through training an independent neural network model, and feature extraction is performed on a target region where the target object of interest is located through the feature extraction model to obtain a first feature extraction result; and when searching through the target box, feature extraction is performed on the region where each target box is located through the feature extraction model to obtain a second feature extraction result. As another optional embodiment, the step of performing target detection on the infrared image to determine the target object is completed by using a target detection model obtained through training a neural network model, and the feature extraction on the specified region of the infrared image may also be implemented by reusing a feature extraction network layer within the target detection model.

The target boxes are set with different step sizes and scales, searching is performed around the target object of interest by taking the position of the target object of interest as a starting position, the feature extraction result of the region where each target box is located is compared with the feature extraction result of the target region where the target object of interest is located, and the region where the target box with the highest feature similarity is located is determined as the target tracking region of the target object of interest to obtain the trajectory prediction information.

In the above embodiment, single-target tracking is performed on the user-selected target object of interest, and the trajectory prediction information of the target object of interest is obtained based on the single-target tracking result. The computational process of the single-target tracking can be iterative, and the single-target tracking result obtained in one iteration process can be used to optimize the setting parameters of the target boxes in the next iteration process, thereby further reducing the computational amount of the target tracking and improving the accuracy of the target tracking result.

Optionally, after determining, according to the feature similarity between the second feature extraction result corresponding to each target box and the first feature extraction result, the region corresponding to the target box with feature similarity meeting the requirement as the target tracking region of the target object of interest, the method further includes:

determining, based on the relative position information between the target tracking region and the target region, a reference step size and a reference direction for the next trajectory prediction of the target object of interest.

The relative position information between the target tracking region and the target region may refer to vector magnitude and vector direction calculated based on center coordinates of the target tracking region and center coordinates of the target region, the vector magnitude corresponding to the relative distance between the two regions, which can serve as a reference for the step size of the target object's movement in the next trajectory prediction, and the vector direction corresponding to the relative angle between the two regions, which can serve as a reference for the direction of the target object's movement in the next trajectory prediction.

In the above embodiment, by determining the reference step size and reference direction for the next trajectory prediction based on the relative position information between the target tracking region and the target region, the efficiency of the next trajectory prediction calculation for the target object of interest can be improved. The computational process of single-object tracking can be iterative. A set of reference step sizes and reference directions can be obtained from each iteration. The single-object tracking result obtained from one iteration can be used to optimize the setting parameters of the target boxes in the next iteration, thereby further reducing the computational amount of target tracking and improving the accuracy of the tracking result.

Optionally, the step of respectively setting the target boxes with different step sizes and scales, searching from the target area as a starting position using these target boxes, and respectively performing feature extraction on the regions where the target boxes are located to obtain the respective second feature extraction results includes:

setting different scales by different ratios based on the size of the target object of interest, setting different step sizes according to the category of the target object of interest following a linear motion pattern, and respectively setting the target boxes in all directions around the target region where the target object of interest is located with the different step sizes and scales; and searching within a specified image region from the target region as the starting position, and performing feature extraction on the regions where the target boxes are located to obtain the respective second feature extraction results.

Figure 10:
FIG. 10 is a schematic diagram of setting a tracking region of a target object of interest in an infrared image in an example.

The scales of the target box may be obtained by scaling the size of the target object of interest by different ratios. For example, if the size of the target object of interest is x, the scales of the target box may be 0.5x, 1x, 1.5x, 2x, and the like. Different step sizes may be set based on the category of the target object of interest and the motion characteristics of the target object of interest corresponding to that category, following a linear motion pattern. The target boxes can be set in different directions (up, down, left, and right) of the target object of interest with different step sizes and different scales, where different step sizes correspond to different pixel distances respectively. For the target objects with faster motion speeds, larger step sizes are typically set; conversely, for target objects with slower motion speeds, smaller step sizes are typically set. As shown in FIG. 10, based on the size x of the target object of interest, target boxes with scales of 1x and 0.5x are sequentially arranged above the target object of interest, target boxes with scales of 1x and 0.5x are sequentially arranged below the target object of interest, and target boxes with scales of 1x, 0.5x and 1x are sequentially arranged on the right side of the target object of interest. In this way, a tracking region range for the target object of interest is formed.

In the above embodiment, the tracking and prediction are performed on the target objects of interest of different categories following a linear motion pattern, which can improve the efficiency of tracking calculation and the accuracy of the target tracking result.

Optionally, the step S103 of performing target detection on the infrared image to determine one or more target objects in the infrared image includes:

performing binarization processing on the infrared image to obtain a corresponding mask image; and performing image morphological filtering on the mask image to obtain a target object mask image corresponding to the infrared image; and fusing the target object mask image with the original infrared image to obtain a target screening image, performing target detection on the target screening image to determine a category and position information of the one or more target objects contained in the infrared image.

Figure 11:
FIG. 11 is a schematic diagram of an original infrared image in an example.
Figure 12:
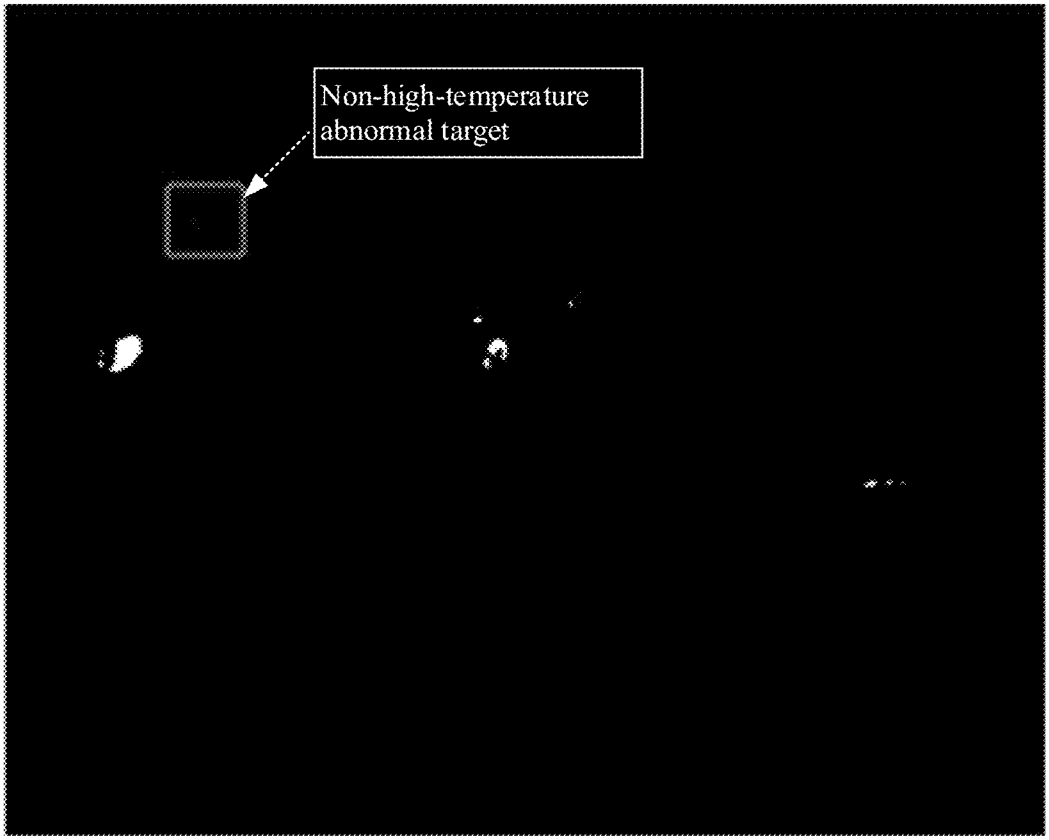
FIG. 12 is a schematic diagram of a mask image obtained by performing binarization processing on the infrared image of FIG. 11.
Figure 13:
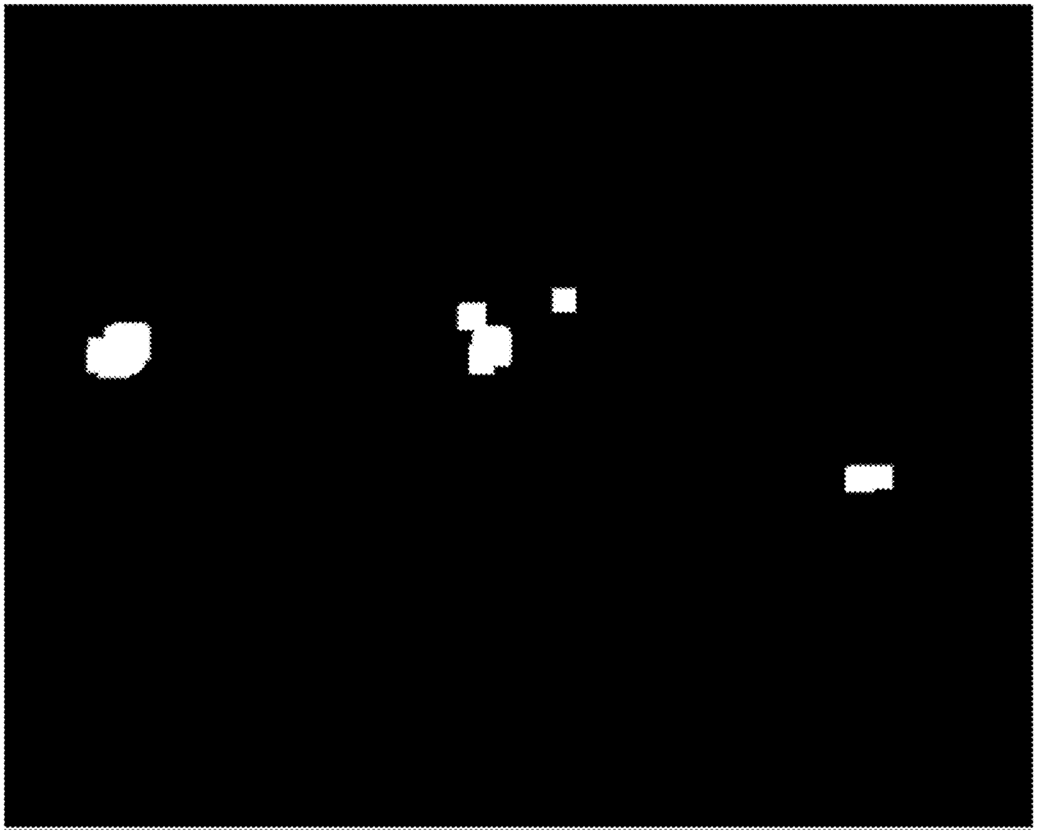
FIG. 13 is a schematic diagram of a target object mask image obtained by performing image morphological filtering on the mask image of FIG. 12.
Figure 14:
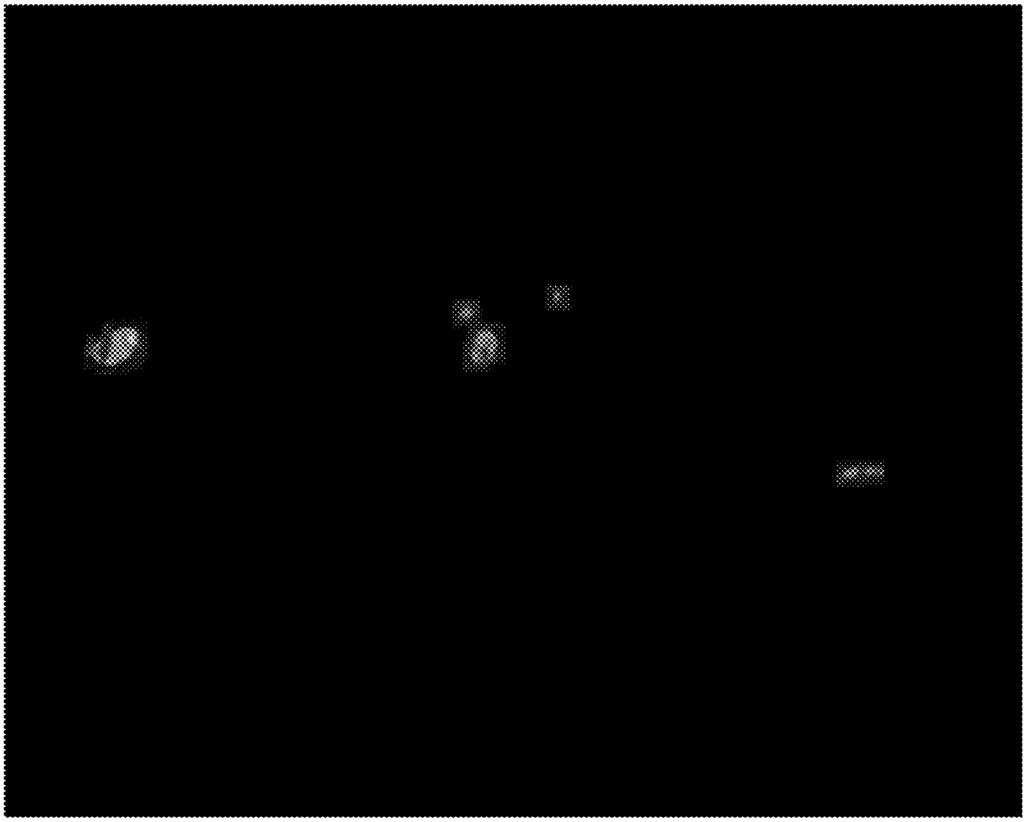
FIG. 14 is a schematic diagram of a target screening image obtained by applying the target object mask image of FIG. 13 to the original infrared image.

The imaging temperature of the target object in the thermal imaging field of view is higher than the imaging temperature of the surrounding environment. By performing binarization processing on the infrared image, the corresponding imaging position of the target object in the infrared image can be coarsely located to obtain a mask image capable of locating the imaging position of each target object in the infrared image. FIG. 11 and FIG. 12 are schematic diagrams of a mask image containing high-temperature targets that is obtained by performing binarization processing on the original infrared image according to an exemplary embodiment. In the binarized image, the white areas correspond to high-temperature target regions, and the separated white breakpoint circled by the box represents a non-high-temperature abnormal target region. During the binarization process, there may be edge discontinuities corresponding to the same target object, and for the case where there are internal voids for the same target object, image morphological filtering is performed on the mask image to eliminate burrs and noise in the mask image to obtain a target object mask image with more complete and clearer contour of each target object. FIG. 13 shows a target object mask image obtained by performing an image morphological filtering on the mask image in a specific example, which contains the true high-temperature target with a more complete and clearer edge. The non-high-temperature abnormal target circled by the box in FIG. 12 has been filtered out after image morphological filtering. The target object mask image is fused with the original infrared image to obtain the target screening image, as shown in FIG. 14. The target screening image is used as an input for target detection to determine the category and position information of the one or more target objects contained in the infrared image.

In the above embodiment, by forming a mask image, performing image morphological filtering on the mask image to form a target object mask image, and using the target object mask image to screen the image information contained in the infrared image, the screened image containing the true target object content is used for the target detection. This approach can not only cover a broader range of target object detection and recognition but also improve the efficiency of target detection and enhance the accuracy of the target detection result.

Optionally, performing target detection on the target screening image to determine a category and position information of the one or more target objects contained in the infrared image includes:

performing target detection on the target screening image through a trained detection model to determine the category and position information of the one or more target objects contained in the infrared image;

The detection model is obtained by training a neural network model with a training sample set, and the training sample set includes training sample images containing different target objects and their respective categories and position labels.

The detection model can employ a convolutional neural network model obtained through training. By using the detection model to perform target detection on the target screening image, the target detection result, including the category and location information of the target objects contained in the infrared image, can be obtained. The training sample set used to train the detection model includes positive training sample images and negative training sample images. The training sample set may be established by collecting infrared images containing target objects to be recognized at different times of day, in different regions, and during different seasons. The target objects to be recognized mainly include, among others, birds, rabbits, cattle, sheep, wolves, dogs, pigs, cats, pedestrians, sedans, trucks, and special-purpose vehicles. The positive training sample images may be original infrared images containing target objects to be recognized and corresponding category and position labels, or they can also be target screening images containing target objects to be recognized and corresponding category and position labels, which are obtained based on the target object mask images. Feature extraction is performed on the training sample images in the training sample set using a deep learning method, which can capture the inherent features between different categories, such as the cars, paws, and postures of animals, the outlines and corners of vehicles, and the physical characteristics of pedestrians, to form the detection model. The number of the original infrared images and target screening images in the positive training sample images can be set in a certain proportion. Including a certain proportion of target screening images containing target objects to be recognized and corresponding category and location labels in the training samples for the detection model can enhance the training speed of the detection model, improve the efficiency of target recognition by the trained detection model, and enhance the efficiency and accuracy of target category screening and target positioning, reducing incorrect detections caused by other interfering backgrounds.

In the above embodiment, a mask image is formed, image morphological filtering is performed on the mask image to form a target object mask image, the target object mask image is used to screen the image information contained in the infrared image, and the screened image containing the true target object content is used for target detection through the trained neural network model. In this way, the shortcomings of the prior art that direct target detection on infrared images using a neural network model yields poor results can be overcome, and the application capability of using a neural network model to process infrared images is effectively enhanced.

Optionally, performing binarization processing on the infrared image to obtain a corresponding mask image includes:

setting pixels in the infrared image that are higher than a temperature threshold to a first grayscale value, and setting pixels lower than the temperature threshold to a second grayscale value, to obtain the corresponding mask image.

Performing image morphological filtering on the mask image to obtain the target object mask image corresponding to the infrared image includes:

performing image processing on the mask image by first performing erosion followed by dilation, to obtain the target object mask image corresponding to the infrared image.

The imaging temperature of the target object in the infrared image is usually higher than the imaging temperature of the surrounding environment. The original infrared image is acquired, and pixels above the temperature threshold and pixels below the temperature threshold are assigned respective values to form the corresponding mask image. In this embodiment, the first grayscale value is 255, and the second grayscale value is 0. Image morphological filtering is primarily used to address the issue that discontinuous edge points in the mask image after binarization processing may lead to internal voids and fragmentation within the same target object. In this embodiment, image morphological filtering performs an opening operation on the mask image in real-time, which involves erosion followed by dilation.

In the above embodiment, by sequentially performing binarization processing and erosion followed by dilation on the original infrared image, a mask image containing the true high-temperature target can be obtained, thereby enhancing the accuracy of target object detection and recognition from the infrared image.

Figure 15:
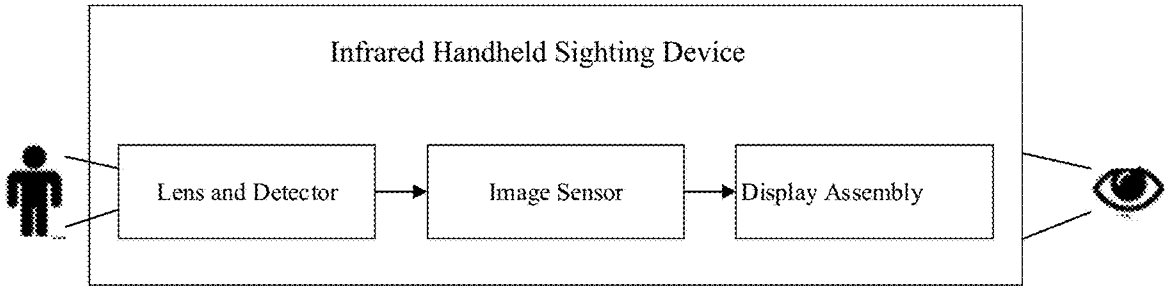
FIG. 15 is a block diagram of an infrared thermal imaging device in an example.
Figure 16:
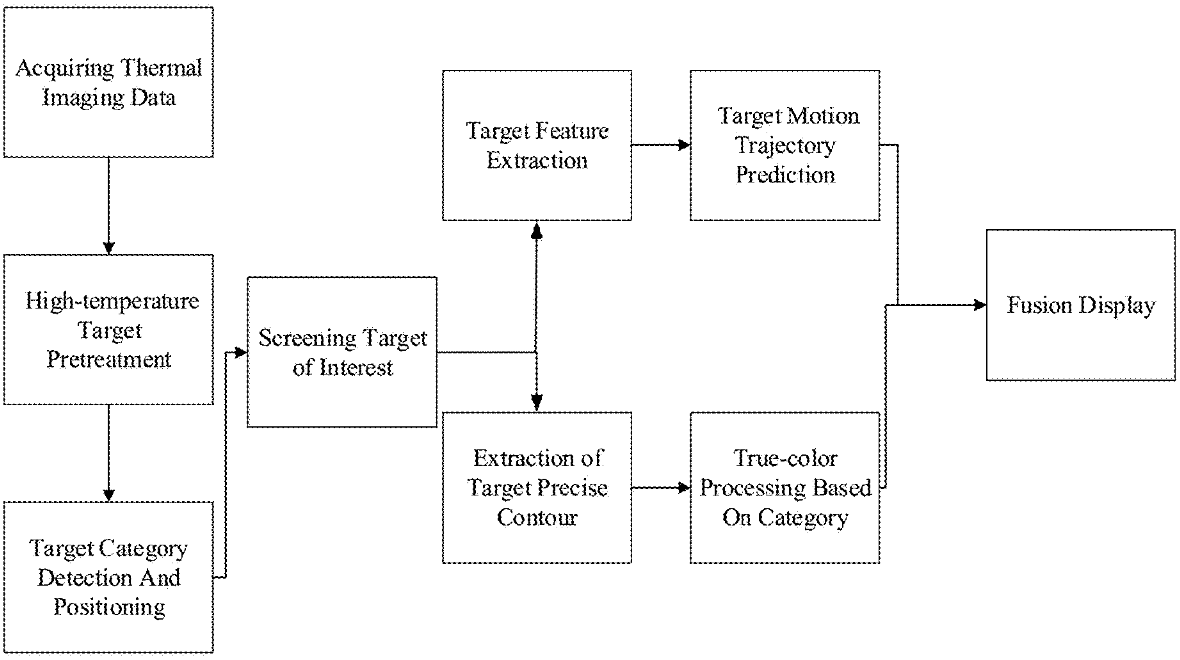
FIG. 16 is a flowchart of an infrared image processing method in an example.
Figure 17:
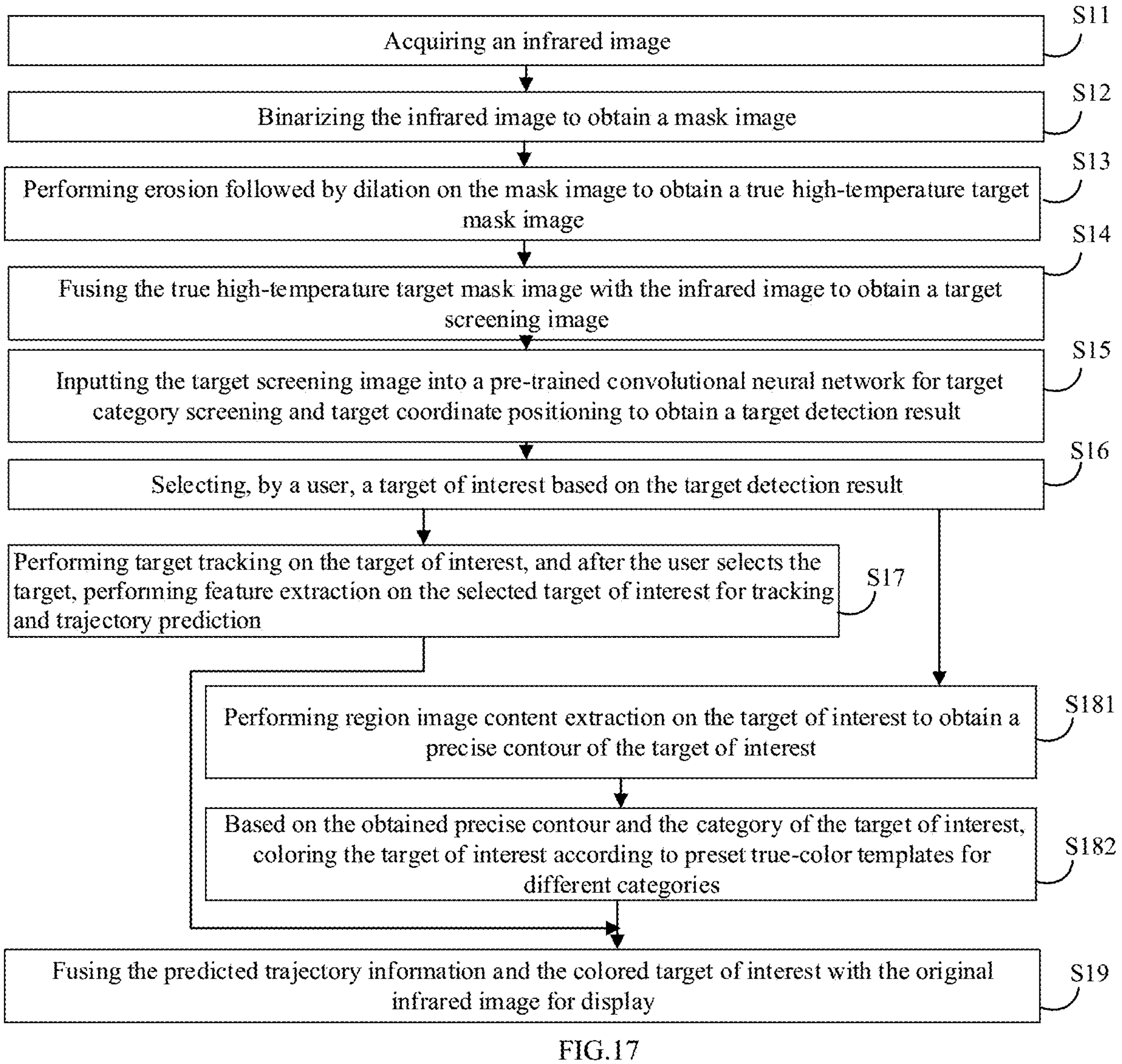
FIG. 17 is a flowchart of an infrared image processing method in an optional specific example.

Referring to FIG. 15 to FIG. 17, in order to have a more comprehensive understanding of the infrared image processing method provided in the embodiments of this application, the following uses a specific example for description.

As shown in FIG. 15, the infrared thermal imaging device includes, but is not limited to, a lens and detector, an image processor, and a display assembly, where the detector includes various types of cooled or non-cooled short-wave, medium-wave, and long-wave detectors. The image processor includes, but is not limited to, various FPGA (Field Programmable Gate Array), SOC (System On A Chip), microcomputer, etc. and the display assembly is not limited to various display modules such as an Organic Light-Emitting Diode (OLED), a Liquid Crystal Display (LCD), a Liquid Crystal On Silicon (LCOS), and an optical waveguide.

Infrared rays are projected onto the focal plane detector through the lens. The detector converts an infrared light signal into an electronic signal and transmits it to the image processor. The image processor is the core component of the infrared thermal imaging device's image processing system, which processes the signal transmitted from the detector. The processed image is then transmitted to the display assembly for display. The human eye observes the display assembly to obtain the final infrared image. The main processes performed by the image processor are shown in FIG. 16 and FIG. 17, including the following steps:

S11, acquiring an infrared image (i.e., the original infrared data, as shown in FIG. 10);

S12, binarizing the infrared image to obtain a mask image (as shown in FIG. 12). The infrared image is preprocessed based on the ambient temperature. The temperature threshold setting may be from a temperature sensor or user setting. The human eye is more sensitive to high-temperature targets. Points in the thermal imaging field of view that are above the temperature threshold are set to 255, while points below the temperature threshold are set to 0, forming a binarized mask.

S13, performing erosion followed by dilation on the mask image to obtain a true high-temperature target mask image (as shown in FIG. 13). The obtained mask may have discontinuous edge points and internal voids within the same target. The purpose of performing erosion followed by dilation on the mask image is to eliminate burrs and noise to obtain the true target data.

S14, fusing the true high-temperature target mask image with the infrared image to obtain a target screening image (as shown in FIG. 14). Portions of the mask that are white retain the original image content, while for portions that are black in the mask, the content in the original image is set to 0.

S15, inputting the target screening image into a pre-trained convolutional neural network for target category screening and target coordinate positioning to obtain a target detection result (as shown in FIG. 9). Using the screened target screening image as the input for the neural network model can reduce incorrect detections caused by other interfering backgrounds. The main operations for target classification and positioning include: collecting a large number of samples at different times of day, in different regions, and during different seasons, mainly including samples of birds, rabbits, cattle, sheep, wolves, dogs, pigs, cats, pedestrians, sedans, trucks, and special-purpose vehicles; using a deep learning method to extract features from the dataset to obtain the inherent features between different categories, such as the cars, paws, and postures of animals; the outlines and corners of vehicles; and the physical characteristics of pedestrians, to form a detection model. This detection model can also distinguish the background and has good overall adaptability to the environment. By inputting the high-temperature target content obtained from the infrared image into the pre-trained target detection neural network, the category, ID number, and coordinate position of the target can be obtained.

S16, selecting, by a user, a target of interest based on the target detection result;

S17, performing target tracking on the target of interest, and after the user selects the target, performing feature extraction on the selected target of interest for tracking and trajectory prediction.

In step 1, feature extraction is performed on the target of interest. Common single-target feature extraction includes, but are not limited to, extraction of Haar features, HOG features, or features extracted based on a convolutional neural network. Taking HOG features as an example, assuming that the target with ID number 1 is selected, according to the coordinate position of the target ID 1, the feature extraction is performed on the target. The target detection network outputs four pieces of information for each target, namely (x, y, w, h), as the target's position information, where (x, y) is the center point position of the target, and (w, h) is the width and height of the object. The HOG feature calculation only processes the content of the target region, mainly including four steps: gradient calculation, gradient histogram calculation, block normalization, and HOG feature statistics. Gradient calculation is taken as an example, and the other processes are completed using standard calculation procedures: a total gradient magnitude of the pixel point is calculated as $$g = \sqrt{g_x^2 + g_y^2},$$

and a gradient direction is calculated as $$\theta = \arctan\frac{g_x}{g_y},$$

with the gradient direction taken as an absolute value, where $g_x$ represents a horizontal gradient of a single pixel point which is the difference in pixel values between left and right neighbouring pixel points, and $g_y$ represents a vertical gradient which is the difference in pixel values between upper and lower neighbouring pixel points.

In step 2, tracking and prediction are performed on the target in a linear motion pattern, and searching is performed around the target with different step sizes and scales. Different step sizes refer to setting target boxes across different pixel distances in up, down, left, and right directions. Different scales refer to setting selection regions with different scaled sizes, such as 0.5x, 1x, 1.5x, 2x, etc., at different positions based on the size of the initial target ID 1. Feature extraction is also performed on the selected target regions, and the results are compared with the feature extraction result of the target of interest. The target region with the highest feature similarity is selected as the single-target tracking result. The vector magnitude and direction between the center points of the single-target tracking result and the selected target are calculated. The vector magnitude serves as a reference for the step size of the target's movement in the next prediction, and the vector direction serves as a reference for the direction of the target's movement in the next prediction. This method focuses on extracting the regional features of this location.

In step 3, the above steps 1 and 2 can be repeated to obtain multiple sets of motion reference step sizes and speeds, which can gradually improve the accuracy of the single-target motion trajectory prediction.

S181, performing region image content extraction on the target of interest to obtain a precise contour of the target of interest (FIG. 3);

After screening all the output targets, assuming that target ID 1 is selected as the target of interest, the region image content extraction is performed based on the coordinate position information of the target ID 1. Then, the precise contour of the target of interest is obtained using a background and foreground segmentation method, including but not limited to, Otsu's method, grayscale threshold segmentation, temperature segmentation, or convolutional neural network segmentation.

S182, based on the obtained precise contour and the category of the target of interest, coloring the target of interest according to preset true-color templates for different categories (FIG. 4). By coloring, the target of interest is made more prominent and perceptible to the human eye. Overall, different colors are assigned to humans and different types of animals to avoid the inability to distinguish specific types due to similar temperatures, which can especially meet the requirements of outdoor hunting scenarios;

S19, fusing the predicted trajectory information and the colored target of interest with the original infrared image for display (as shown in any of the display modes in FIG. 5 to FIG. 8). The original target may be too small in the field of view, which is not conducive to observation. The original target can be enlarged and then fused with the original infrared image according to the user's set position for display. After the target highlighting process, the details and contour of the target in the infrared image are clearer. Compared to a pure grayscale image, a significant color difference is more noticeable than a grayscale difference, making the target easier to be found. The display modes can include various types, such as: directly enlarging the original image for display, replacing the original target with an enlarged true-color target; displaying the predicted position using a circle to represent the location and an arrow to represent the predicted direction of movement; displaying the predicted position and adding a virtual target, etc.

Figure 18:
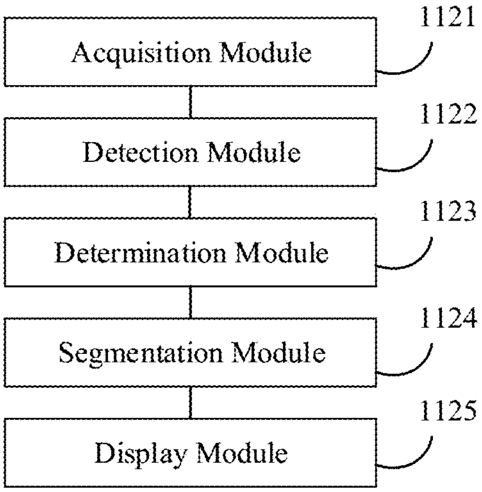
FIG. 18 is a block diagram of an image processing apparatus according to an embodiment.

Referring to FIG. 18, another aspect of the present application provides an infrared image processing apparatus. In an exemplary embodiment, the infrared image processing apparatus can be implemented by an infrared handheld sighting device. The infrared image processing apparatus includes: an acquisition module 1121 configured to acquire infrared images; a detection module 1122 configured to perform target detection on the infrared image to determine one or more target objects within the infrared image; a determination module 1123 configured to determine a target object of interest from the one or more target objects; a segmentation module 1124 configured to determine a contour area of the target object of interest; and a display module 1125 configured to perform true-color processing on the contour area based on a category of the target object of interest, and highlight the target object of interest within the infrared image.

Optionally, the determination module 1123 is configured to determine the target object of interest based on a selection operation on the target object.

Optionally, the display module 1125 is further configured to determine a corresponding true-color template based on the category of the target object of interest, and to color the contour area of the target object of interest in the infrared image according to the corresponding true-color template before displaying it.

Optionally, the segmentation module 1124 is further configured to segment the target object of interest based on its position information to obtain a contour segmentation image of the target object of interest; the display module 1125 is further configured to determine a corresponding true-color template based on the category of the target object of interest, color the contour segmentation image according to the corresponding true-color template, fuse the colored contour segmentation image with the original infrared image, and/or enlarge the colored contour segmentation image by a preset ratio and fuse it with the original infrared image at a specified display position.

Optionally, the apparatus also includes a tracking module configured to track the target object of interest to obtain trajectory prediction information; the display module 1125 is further configured to display motion trajectory prompt information of the target object of interest in the infrared image based on the trajectory prediction information.

Optionally, the display module 1125 is also configured to display motion direction prompt information on one side of the target object of interest in the infrared image based on the trajectory prediction information; and/or to determine a motion path of the target object of interest based on the trajectory prediction information and display the motion path in the infrared image; and/or to determine a next predicted position of the target object of interest in the infrared image based on the trajectory prediction information, and display a corresponding virtual image of the target object of interest at the next predicted position in the infrared image.

Optionally, the tracking module is also configured to determine the target object of interest based on a selection operation on the target object; the feature extraction is performed on a target region of the target object of interest to obtain a first feature extraction result; target boxes are set with different step sizes and scales, and searching is performed from the target region as a starting position, feature extraction is performed on the regions within the target boxes to obtain respective second feature extraction results; based on the feature similarity between the second feature extraction results of the respective target boxes and the first feature extraction result, the region corresponding to the target box with feature similarity meeting a requirement is determined as a target tracking region of the target object of interest; and the trajectory prediction information is obtained based on the target tracking region.

Optionally, the tracking module is also configured to determine the reference step size and reference direction for the next trajectory prediction of the target object of interest based on the relative position information between the target tracking region and the target region.

Optionally, the tracking module is also configured to set different scales by different ratios based on the size of the target object of interest, set different step sizes based on the category of the target object of interest following a linear motion rule, and set target boxes in all directions around the target region of the target object of interest with the different step sizes and scales; searching is performed within a specified image area from the target region as the starting position, and the feature extraction is performed on the regions within the target boxes to obtain the respective second feature extraction results.

Optionally, the detection module 1122 is also configured to perform binarization processing on the infrared image to obtain a corresponding mask image; to perform image morphological filtering on the mask image to obtain a target object mask image corresponding to the infrared image; to fuse the target object mask image with the original infrared image to obtain a target screening image, and to perform target detection on the target screening image to determine the category and location information of the one or more target objects contained in the infrared image.

Optionally, the detection module 1122 is further configured to perform target detection on the target screening image using a trained detection model to determine the category and location information of the one or more target objects contained in the infrared image; the detection model is obtained by training a neural network model with a training sample set, and the training sample set includes training sample images containing different target objects and their respective categories and location labels.

Optionally, the detection module 1122 is further configured to set the pixels in the infrared image that are above a temperature threshold to a first grayscale value; to set the pixels that are below the temperature threshold to a second grayscale value, to obtain a corresponding mask image; and to perform image processing on the mask image by first performing erosion followed by dilation, to obtain a target object mask image corresponding to the infrared image.

It should be noted that, in the process of implementing target highlighting and tracking processing, the infrared image processing apparatus provided in the above embodiment is only exemplified by the division of the above program modules. In actual applications, the above processing can be assigned to different program modules according to needs, that is, the internal structure of the apparatus can be divided into different program modules to complete all or part of the method steps described above. In addition, the infrared image processing apparatus provided in the above embodiment and the infrared image processing method embodiment belong to the same concept. The specific implementation process can be referred to in the method embodiments, and will not be repeated here.

Figure 19:
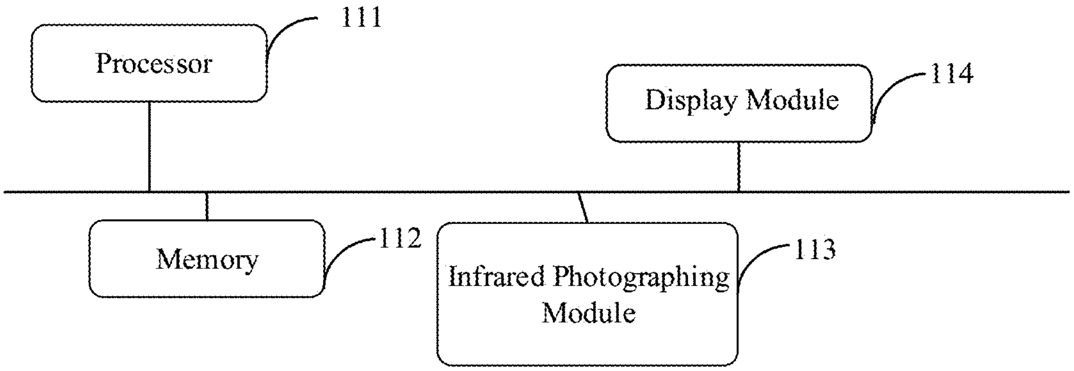
FIG. 19 is a block diagram of an infrared thermal imaging device according to an embodiment.

Another aspect of the present application provides an infrared thermal imaging device. FIG. 19 shows an optional hardware structure of the infrared thermal imaging device provided in the embodiment of this application. The infrared thermal imaging device includes a processor 111 and a memory 112 connected to the processor 111. The memory 112 is configured to store various types of data to support the operation of the image processing device and stores a computer program for implementing the infrared image processing method provided in any embodiment of this application. The computer program, when executed by the processor, realizes the steps of the infrared image processing method provided in any embodiment of this application and achieves the same technical effects. To avoid repetition, further details are omitted here.

Optionally, the infrared thermal imaging device further includes an infrared photographing module 113 and a display module 114 connected to the processor 111. The infrared photographing module 113 is configured to capture infrared images as the images to be processed and send them to the processor 111. The display module 114 is configured to display the infrared images output by the processor 111, with the target object of interest highlighted in the infrared images.

Embodiments of this application also provide a computer-readable storage medium, which stores a computer program. When the computer program is executed by the processor, it realizes the processes of the above-mentioned infrared image processing method embodiments and achieves the same technical effects. To avoid repetition, further details are omitted here. The computer-readable storage medium may be, for example, read-only memory (ROM), random access memory (RAM), a magnetic disk, or an optical disk.

It should be noted that in this text, the terms "include," "comprise," or any other variants thereof are intended to cover non-exclusive inclusions. Thus, a process, method, item, or device that includes a series of elements not only includes those elements but also includes other elements not explicitly listed, or elements inherent to such process, method, item, or device. Unless otherwise restricted, an element defined by the statement "including a . . . " does not exclude the presence of additional identical elements in the process, method, item, or device that includes the element.

Through the description of the above implementation methods, those skilled in the art can clearly understand that the methods of the above embodiments can be implemented with the aid of software plus a necessary general hardware platform. Of course, they can also be implemented through hardware, but in many cases, the former is a better implementation method. Based on this understanding, the essential aspect of the technical solution of this invention, or put differently, the part of the technical solution that makes contributions to the existing technology, can be embodied in the form of a software product. The computer software product is stored in a storage medium (such as ROM/RAM, a magnetic disk, an optical disk), which includes several instructions to enable a terminal (which can be an infrared imaging device, mobile phone, computer, server, or network device, etc.) to execute the methods described in the various embodiments of this invention.

The above description is merely a specific implementation of this application. However, the scope of protection of this application should not be limited thereto. Any person skilled in the art can easily think of variations or substitutions within the technical scope disclosed by this application, and these should all be covered within the scope of protection of this application. Therefore, the scope of protection of this application should be defined by the appended claims.

What is claimed is:

1. An infrared image processing method, comprising:

acquiring an infrared image;

performing target detection on the infrared image to determine one or more target objects within the infrared image and obtaining a target detection result that include a category of each of the one or more target objects;

determining a target object of interest from the one or more target objects based on the target detection results;

determining a contour area of the target object of interest;

performing true-color processing on the contour area based on the category of the target object of interest to highlight the target object of interest in the infrared image, comprising:

determining a corresponding true-color template based on the category, wherein corresponding true-color templates are preset for different categories, of the target object of interest, and coloring the contour area of the target object of interest in the infrared image according to the corresponding true-color template for display.

2. The infrared image processing method according to claim 1, wherein determining the target object of interest from the one or more target objects includes:

determining the target object of interest based on a selection operation on the target object.

3. The infrared image processing method according to claim 1, wherein determining the contour area of the target object of interest includes:

segmenting the target object of interest based on its position information to obtain a contour segmentation image of the target object of interest;

wherein determining a corresponding true-color template based on the category of the target object of interest, and coloring the contour area of the target object of interest in the infrared image according to the corresponding true-color template for display comprises:

determining a corresponding true-color template based on the category of the target object of interest, coloring the contour segmentation image according to the corresponding true-color template, fusing the colored contour segmentation image with the original infrared image, and/or enlarging the colored contour segmentation image by a preset ratio and fusing it with the original infrared image at a specified display position.

4. The infrared image processing method according to claim 1, wherein displaying the motion trajectory prompt information of the target object of interest in the infrared image based on the trajectory prediction information includes:

displaying motion direction prompt information on one side of the target object of interest in the infrared image based on the trajectory prediction information.

5. The infrared image processing method according to claim 4, wherein displaying the motion trajectory prompt information of the target object of interest in the infrared image based on the trajectory prediction information includes:

displaying motion direction prompt information on one side of the target object of interest in the infrared image based on the trajectory prediction information.

6. The infrared image processing method according to claim 4, wherein displaying the motion trajectory prompt information of the target object of interest in the infrared image based on the trajectory prediction information includes:

determining a motion path of the target object of interest based on the trajectory prediction information and displaying the motion path in the infrared image.

7. The infrared image processing method according to claim 4, wherein displaying the motion trajectory prompt information of the target object of interest in the infrared image based on the trajectory prediction information includes:

determining a next predicted position of the target object of interest in the infrared image based on the trajectory prediction information, and displaying a corresponding virtual image of the target object of interest at the next predicted position in the infrared image.

8. The infrared image processing method according to claim 4, wherein performing target tracking on the target object of interest to obtain trajectory prediction information includes:

performing feature extraction on a target region of the target object of interest to obtain a first feature extraction result;

setting target boxes with different step sizes and scales, searching from the target region as a starting position, respectively performing feature extraction on regions where the target boxes are located to obtain respective second feature extraction results;

based on feature similarity between the second feature extraction result of each target box and the first feature extraction result, determining the region where the target box whose feature similarity meets a requirement is located as a target tracking region of the target object of interest; and obtaining the trajectory prediction information based on the target tracking region.

9. The infrared image processing method according to claim 8, wherein, after, based on feature similarity between the second feature extraction result of each target box and the first feature extraction result, determining the region where the target box whose feature similarity meets a requirement is located as a target tracking region of the target object of interest, the method further comprises:

determining a reference step size and a reference direction for a next trajectory prediction of the target object of interest based on relative position information between the target tracking region and the target region.

10. The infrared image processing method according to claim 8, wherein, setting target boxes with different step sizes and scales, searching from the target region as a starting position, respectively performing feature extraction on regions where the target boxes are located to obtain respective second feature extraction results, includes:

setting different scales by different ratios based on the size of the target object of interest, setting different step sizes according to the category of the target object of interest following a linear motion pattern, and respectively setting the target boxes in all directions around the target region where the target object of interest is located with the different step sizes and scales; and searching within a specified image region from the target region as the starting position, and performing feature extraction on the regions where the target boxes are located to obtain the respective second feature extraction results.

11. The infrared image processing method according to claim 1, wherein performing target detection on the infrared image to determine one or more target objects includes:

performing binarization processing on the infrared image to obtain a corresponding mask image;

performing image morphological filtering on the mask image to obtain a target object mask image corresponding to the infrared image;

fusing the target object mask image with the original infrared image to obtain a target screening image, and performing target detection on the target screening image to determine category and position information of the one or more target objects contained in the infrared image.

12. The infrared image processing method according to claim 11, wherein performing target detection on the target screening image to determine category and position information of the one or more target objects contained in the infrared image includes:

performing target detection on the target screening image using a trained detection model to determine the category and location information of the one or more target objects contained in the infrared image;

wherein the detection model is obtained by training a neural network model with a training sample set, the training sample set including training sample images containing different target objects and their respective categories and position labels.

13. The infrared image processing method according to claim 11, wherein performing binarization processing on the infrared image to obtain the corresponding mask image includes:

setting pixels in the infrared image that are above a temperature threshold to a first grayscale value, and setting pixels that are below the temperature threshold to a second grayscale value, to obtain the corresponding mask image;

performing image processing on the mask image by first performing erosion followed by dilation to obtain the target object mask image corresponding to the infrared image.

14. The infrared image processing method according to claim 1, wherein, the target object of interest is determined from the target detection result in at least one of the following manners: taking the target object of a preset category in the target detection result as the target object of interest; taking the target object located at a preset position in the infrared image in the target detection result as the target object of interest; taking the target object whose size meets a preset requirement in the target detection result as the target object of interest; and taking the target object selected by an interactive operation from the target detection result as the target object of interest.

15. An infrared thermal imaging device, characterized by comprising a processor, a memory coupled to the processor, and a computer program stored on the memory and executable by the processor, wherein the computer program, when executed by the processor, implements an infrared image processing method comprising:

acquiring an infrared image;

performing target detection on the infrared image to determine one or more target objects within the infrared image and obtaining a target detection result that include a category of each of the one or more target objects;

determining a target object of interest from the one or more target objects based on the target detection results;

determining a contour area of the target object of interest;

performing true-color processing on the contour area based on the category of the target object of interest to highlight the target object of interest in the infrared image, comprising:

determining a corresponding true-color template based on the category, wherein corresponding true-color templates are preset for different categories, of the target object of interest, and coloring the contour area of the target object of interest in the infrared image according to the corresponding true-color template for display.

16. The infrared thermal imaging device according to claim 15, further comprising an infrared photographing module and a display module connected to the processor;

wherein the infrared photographing module is configured to capture an infrared image and send it to the processor;

the display module is configured to display the infrared image output by the processor, with the target object of interest being highlighted in the infrared image.

17. The infrared thermal imaging device according to claim 15, wherein, in the infrared image processing method, determining the contour area of the target object of interest comprises segmenting the target object of interest based on its position information to obtain a contour segmentation image of the target object of interest;

wherein determining a corresponding true-color template based on the category of the target object of interest, and coloring the contour area of the target object of interest in the infrared image according to the corresponding true-color template for display comprises:

determining a corresponding true-color template based on the category of the target object of interest, coloring the contour segmentation image according to the corresponding true-color template; and fusing the colored contour segmentation image with the original infrared image, and/or enlarging the colored contour segmentation image by a preset ratio and fusing it with the original infrared image at a specified display position.

18. The infrared thermal imaging device according to claim 15, wherein, in the infrared image processing method, after determining a target object of interest from the one or more target objects, the method further comprises:

performing target tracking on the target object of interest to obtain trajectory prediction information; and displaying motion trajectory prompt information of the target object of interest in the infrared image based on the trajectory prediction information.

19. A non-transitory computer-readable storage medium, characterized in that the computer-readable storage medium stores a computer program thereon, wherein the computer program, when executed by a processor, implements the infrared image processing method according to claim 1.

* * * * *